(12) United States Patent
Carlson

(10) Patent No.: US 6,739,581 B1
(45) Date of Patent: May 25, 2004

(54) WIRE FEEDING GUIDE FOR USE WITH AN ELECTRICAL BOX

(76) Inventor: James H. Carlson, 6702 Pauline Ave., Crystal Lake, IL (US) 60014

( * ) Notice: Subject to any disclaimer, the term of this patent is extended or adjusted under 35 U.S.C. 154(b) by 0 days.

(21) Appl. No.: 10/219,899

(22) Filed: Aug. 15, 2002

(51) Int. Cl.[7] .................................................. H02G 1/08
(52) U.S. Cl. ............................ 254/134.3 R; 254/134.4
(58) Field of Search ..................... 254/134.3 R, 134.4, 254/134.3 FT

(56) References Cited

U.S. PATENT DOCUMENTS

| | | | | |
|---|---|---|---|---|
| 3,005,620 A | * | 10/1961 | Trunnell | ............... 254/134.3 R |
| 4,132,665 A | * | 1/1979 | Nelson | ................ 254/134.3 R |
| D401,907 S | * | 12/1998 | Gazerro | ..................... D13/155 |
| 6,340,271 B1 | * | 1/2002 | Carlson et al. | ..... 254/134.33 R |

* cited by examiner

Primary Examiner—Lee D. Wilson
(74) Attorney, Agent, or Firm—Jon C. Gealow

(57) ABSTRACT

A wire feeding guide for use in feeding wire through an electrical box and a conduit secured over a hole in the electrical box. The wire feeding guide includes a trough-like member, a support arrangement for supporting the trough-like member on an electrical box, and a wire retention element for retaining a wire or wires on the trough-like member. The trough-like member directs the wire through the open side of the electrical box to the desired hole in the electrical box. The wire retention element retains the wire or wires on the trough-like member as they are being pulled over the trough-like member. The support arrangement includes portions which engage the electrical box to support the trough-like member in the desired position.

42 Claims, 8 Drawing Sheets

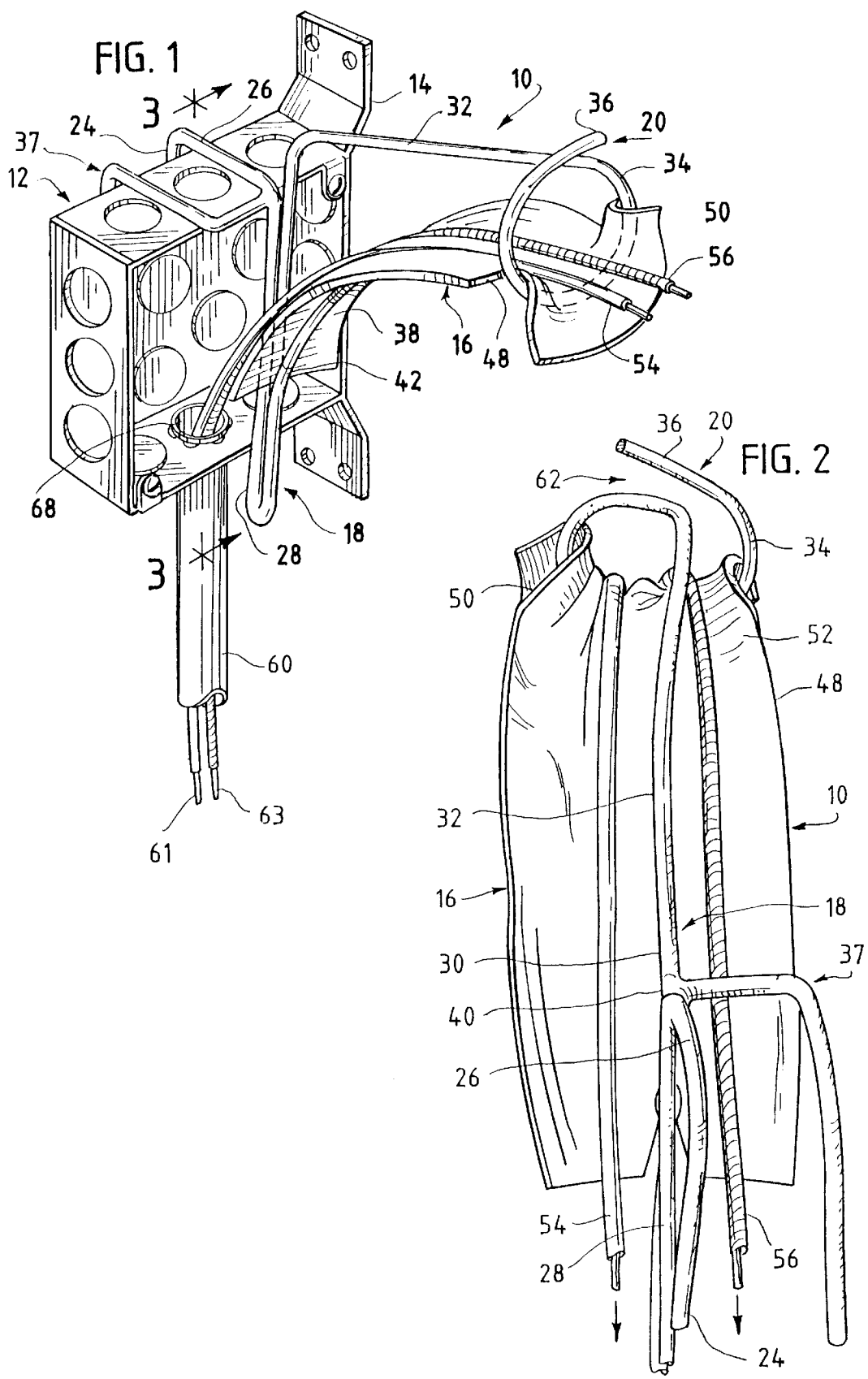

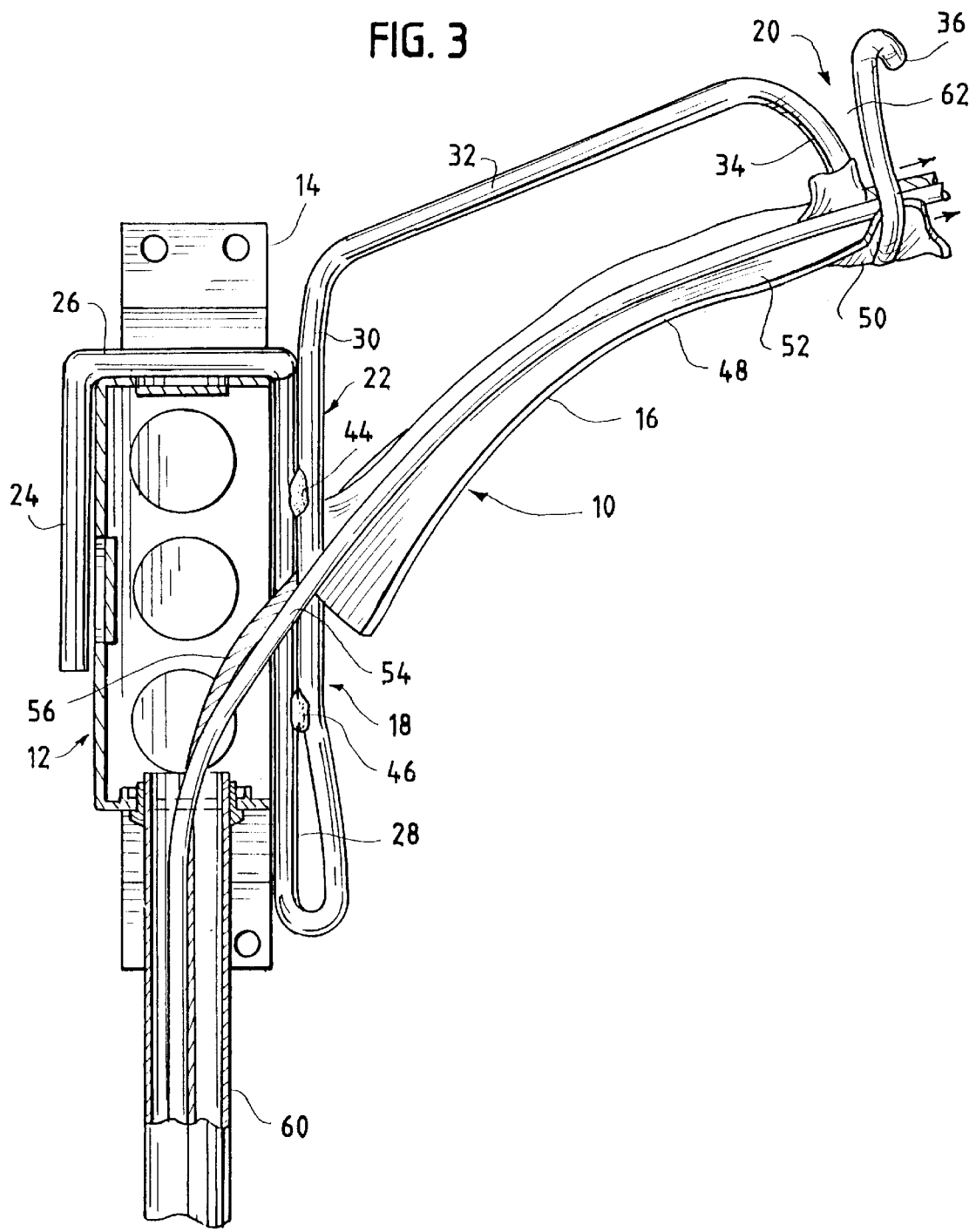

WIRE FEEDING GUIDE FOR USE WITH AN ELECTRICAL BOX

FIELD OF THE INVENTION

The present invention relates to a wire feeding guide for use in guiding wires through a hole in an electrical box and into a conduit extending from the electrical box. More particularly it relates to a wire feeding guide which may be easily attached to an electrical box for guiding one or more wires into a conduit secured over a hole in an electrical box and extending from the electrical box.

BACKGROUND OF THE INVENTION

To provide for electrical service in a building, various types of electrical boxes are installed in the walls, ceiling or floor of buildings. Switch or outlet boxes are installed where switches or outlets are desired. Junction boxes are installed where a plurality of wires are to be connected to each other. Electrical boxes are typically of a square, rectangular, or round shape, with a back, sidewalls and an open front. Holes are provided in the walls and back of electrical boxes to receive wires or cables which are typically connected in the electrical box to an electrical service device such as a switch, outlet, or lighting fixture, or to each other. Before a wire or cable is passed through a hole in an electrical box, a fitting may be mounted in the hole to protect the wire or cable from the sharp edges of the hole. The fitting or coupling may also be used to secure a conduit, that is a pipe, to the electrical box, such that wires passed through the hole may be run through the conduit.

When it is necessary to pull wire through a hole in an electrical box, a coil of wire is placed adjacent to the electrical box, with the wire to be pulled through the hole being supplied from the coil of wire. The wire to be pulled from the coil must be properly aligned with the hole to permit it to be pulled from the coil. If two or more people are working together to install the electrical service, one person can pull the wire, while the other one feeds the wire through the hole in the electrical box. However, if a person is working alone, it is difficult to both keep the wire in the proper position to be fed into the hole, and to also pull it from the hole. It might be possible to carefully position a coil or length of wire with respect to the hole, such that the wire would unwind from the coil directly into the hole. However, due to the small size of electrical boxes, it is most often not possible to position the coil to feed wire to a hole in an electrical box, without the wire rubbing on the edges of box surrounding the open front.

Accordingly, it would be advantageous to provide a wire feeding guide which will permit a person working alone to pull wire or cable through a conduit secured over a hole in an electrical box. It would be even more advantageous to provide such a wire feeding guide which is readily attached to and removed from an electrical box, and which retains the wire while being pulled through the electrical box. Such a wire feeding guide would be attached to an electrical box, merely by being properly positioned on the box, without the need for adjusting any type of fastening device, such as threaded members or clamps.

SUMMARY OF THE INVENTION

It is an object of this invention to provide a wire feeding guide for feeding wire into an electrical box and through a hole in the electrical box from a source of wire as the wire is being pulled from a conduit connected to the hole. It is another object of this invention to provide a wire feeding guide for feeding wire into an electrical box and through a hole in the electrical box from a source of wire as the wire is being pulled from the box, and through a conduit connected to the hole by a person working alone. It is a further object of this invention to provide a wire feeding guide for feeding wire into a electrical box and through a hole in the electrical box, which is readily attached to and supported by the electrical box, and which is easily removed from the electrical box after use. It is a still further object of this invention to provide a wire feeding guide which is provided with a wire retainer having an opening therein, through which the wire may be readily inserted and removed, and which retains the wire while being fed over the wire feeding guide.

A wire feeding guide in accordance with this invention includes a trough-like member, a support arrangement for supporting the trough-like member on an electrical box, and a wire retention element for retaining a wire or wires on the trough-like member. The trough-like member is formed with an inlet end for receiving wire from a source, and an outlet end which is positioned to direct the wire to a desired hole in the electrical box. The trough-like member is supported on the electrical box in a position to readily receive wire from a source, and to direct it to a desired hole in the electrical box. The support member is secured to an electrical box by portions of the support member which engage a wall or walls of the electrical box surrounding the open front of the electrical box, a hole in the electrical box, or the outside walls of the electrical box. The trough-like member may be made of any material which may be formed to provide the desired trough shape. Similarly, the support arrangement may be made of any material which may be formed to provide the desired support structure, and which has sufficient strength to support the trough-like member when in use. In several preferred embodiments, the trough-like member is formed of plastic, and the support arrangement is formed of a rigid, but bendable metal wire. The wire retention element is also formed of a rigid, but bendable, metal wire, and may be formed as an extension of the same wire forming the support member. Various methods may be used to secure the trough-like member to the support arrangement. When the trough-like member is formed of plastic, and the support member of metal wire, the plastic trough-like member may be glued to the wire support member.

BRIEF DESCRIPTION OF THE DRAWINGS

FIG. 1 is a front perspective view of a first embodiment of the wire feeding guide of this invention for use with a vertically mounted electrical box;

FIG. 2 is a rear perspective view of the first embodiment of the wire feeding guide of this invention as shown in FIG. 1;

FIG. 3 is side view of the first embodiment of the wire feeding guide of this invention as shown in FIG. 1;

DETAILED DESCRIPTION OF THE PREFERRED EMBODIMENT

Figure 4:
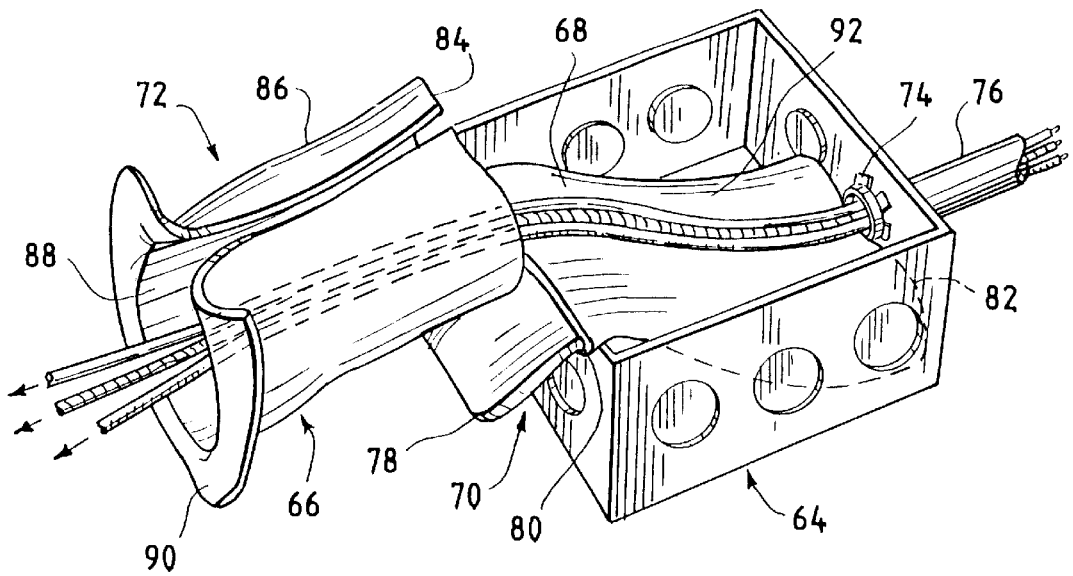
FIG. 4 is perspective view of a second embodiment of the wire feeding guide of this invention for use with a horizontally mounted electrical box.
Figure 5:
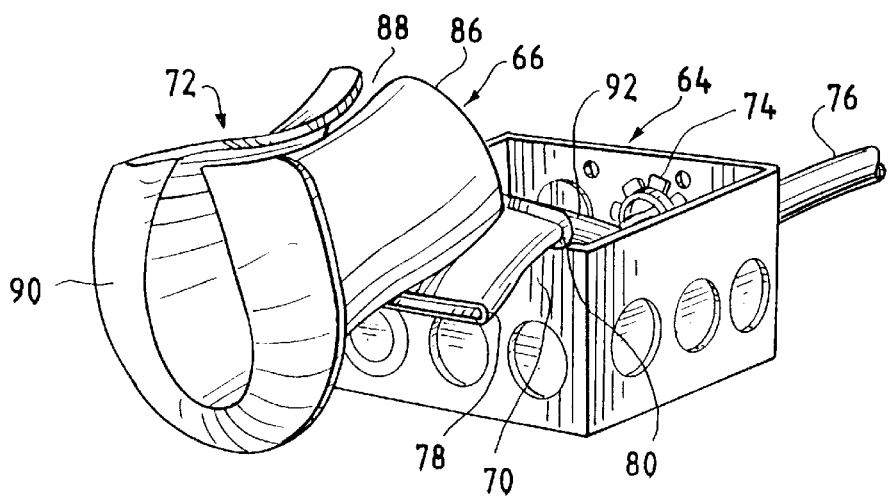
FIG. 5 is a perspective view of the second embodiment of the wire feeding guide of this invention without wires being placed in the wire feeder.
Figure 6:
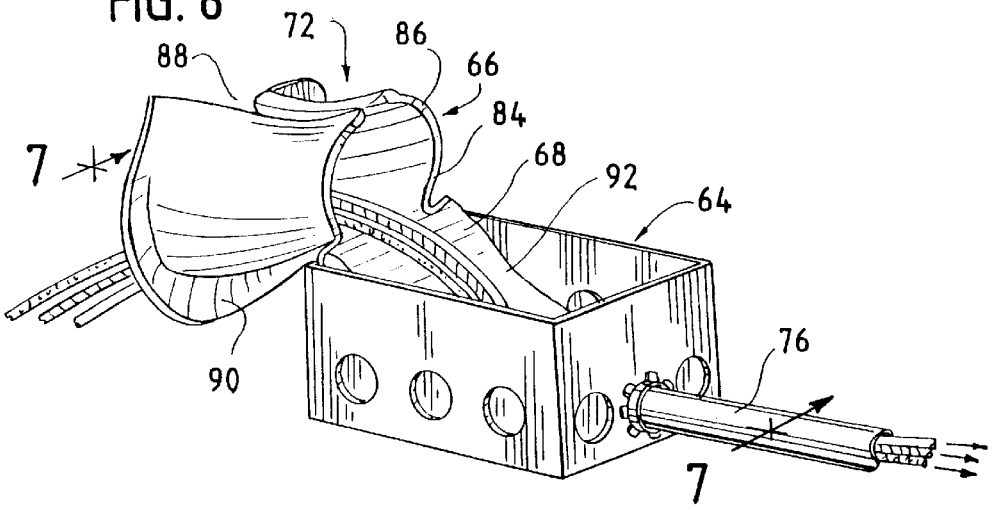
FIG. 6 is another perspective view of the second embodiment of the wire feeding guide of this invention.
Figure 7:
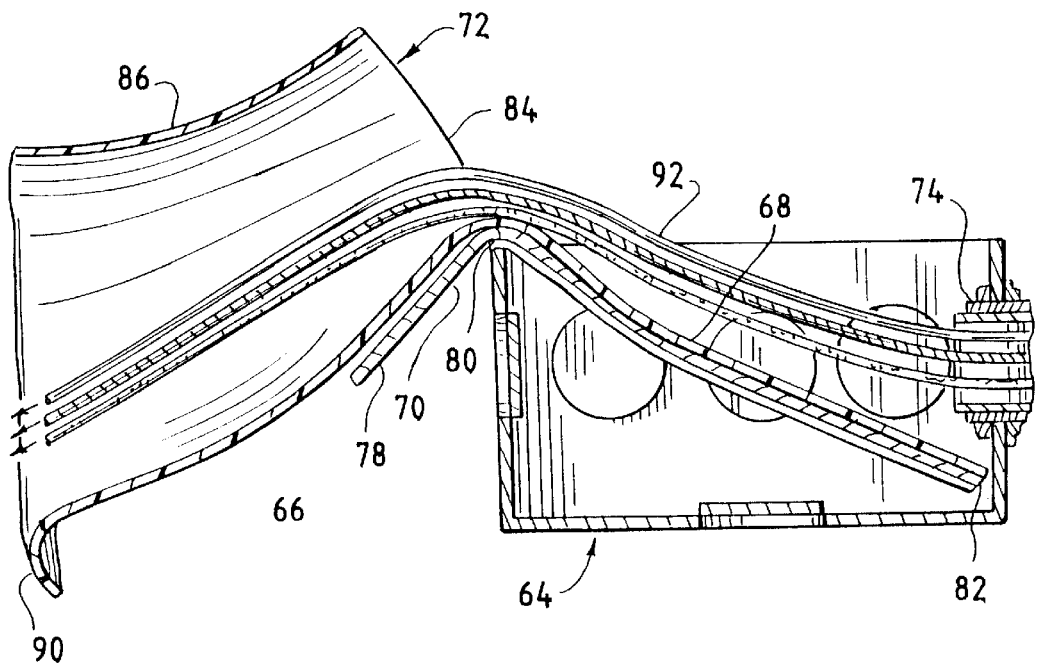
FIG. 7 is a cross-sectional view of the second embodiment of the wire feeding guide of this invention taken along the line 7—7 in FIG. 6.

Referring to FIGS. 1–3, a first embodiment of the wire feeding guide of this invention will be described. A first embodiment of a wire feeding guide 10 in accordance with this invention is shown attached to an electrical box 12. The electrical box 12 is of the type which is mounted within a wall. The electrical box 12 is provided with a mounting plate 14 which is secured to the side of a stud forming a support for the wall. The wire feeding guide includes a trough-like member 16, a support arrangement 18, and wire retention element 20.

The support arrangement 18 and the wire retention element 20 are formed of several pieces of rigid, but bendable wire. A first piece 22 of wire is formed with several bends, to provide a first section 24 which is placed behind the electrical box 12, a second section 26 which rests on top of the electrical box 12, a third section 28 which extends downwardly over the open face of the electrical box and below the bottom wall of the electrical box, a fourth section 30, which extends upwardly adjacent the third section 28 and above second section 26, a fifth section 32 which generally slopes upwardly and outwardly from the box 12, and a sixth section 34 which is formed as a loop, with the free end 36 spaced from and extending over the beginning of the sixth section 34, thus forming the wire retention element 20. The support arrangement 18 includes two additional pieces of wire 37 and 38, with are welded to the first piece 22. Additional piece of wire 37 is welded to wire 22 at the bend between sections 26 and 28 and the adjacent portion of section 30. The weld is shown at 40 in FIG. 2. A first end of additional piece of wire 38 is welded at 42 to the fourth section 30 of the first piece of wire 22. The other end of additional piece of wire 38 is welded to the bottom of the loop form by sixth section 34. To provide the support arrangement with additional strength, third section 28 and fourth section 30 of first piece of wire 22 are welded to each other at 44 and 46 as shown in FIG. 3.

The trough-like member 16 as shown in FIGS. 1–3 is formed from an elongated sheet of plastic 48. The sheet of plastic is formed to have a semicircular portion 50 with a notch to receive the lower portion of the loop formed by the sixth section 34. The section of the elongated sheet of plastic 48 extending from the semicircular portion 50 to the second weld 42 is formed as a wide W-shaped trough 52. The two valleys of the W-shaped trough being on opposite sides of the third and fourth sections of first piece of wire 22. The formed elongated sheet of plastic 48 is secured to additional piece of wire 38, such as by gluing.

As shown in FIGS. 1 and 3, wires 54 and 56 have been placed in the W-shaped trough 52 and directed into hole 58 in electrical box 14. The wires 54 and 56 directed into hole 58 pass through a conduit 60 secured by a fitting to hole 58. With the wires 54 and 56 directed into the hole 58 by the W-shaped trough, ends 61 and 63 of wires 54 and 56 respectively may be pulled to draw the wires from a supply of the wires through the electrical box 14. While it may be possible to pass the ends 61 and 63 of the wires 54 and 56 through the wire retention element 20, as they are fed over the W-shaped trough 52 and into a hole in the electrical box 14, it may not be desirable to cut the wire in order to remove them from the wire retention element 20. In such situations, the wires may be removed from the wire retention element 20 by removing them through the space 62 between the free end 36 and the beginning of the sixth section 34.

Referring now to FIGS. 4–7, a second embodiment of the wire feeding guide of this invention, for use with a horizontal mounted electrical box, will be described. A horizontally mounted electrical box 64 is formed with an open top, a closed bottom and sidewalls with holes therein. As shown in the referenced figures, the second embodiment 66 of the wire feeding guide, like the first, includes a trough-like member 68, a support arrangement 70 and a wire retention element 72. A nut 74 is secured in a hole in a sidewall of the box 64 to secure a conduit 76 to the box 64 in alignment with the hole. A flat rigid member 78 is bent at an angle at 80, such that when a first end 82 of the rigid member 78 is positioned under the nut 74, the bend at 80 will be located over the top of the opposite wall of the box 64. The trough-like member 68 and the wire retention element 72 are formed from an elongated sheet of plastic 84. The wire retention element 72 is formed by shaping a first portion 86 of the sheet of plastic 84 into a tubular or cylindrical shape, with an opening 88 wide enough to receive a wire between the ends of the sheet of plastic forming the cylindrical shape. The free end of the tubular shaped first portion 86 of the sheet of plastic is formed as a flange 90, which strengthens to the tubular portion, or wire retention element 72, and serves as a guide to directing wire into the wire retention element 72. A second portion 92 of the plastic sheet 84 is secured to the portion of the flat rigid member 78 which extends into the box 64. Both the second portion 92 of the plastic sheet 84 and the portion of the flat rigid member to which it is secured, are bend to form a trough for guiding a wire or wires into the hole in the wall of the box 64 and connected conduit 76. As in the first embodiment, the second embodiment of the wire feeding guide makes it possible to pull wire through the box 64 and into conduit 76, without the need for a person to correctly position the wire for feeding. Thus, a spool or reel of wire may be positioned on the same horizontal surface supporting the box 64, and fed through the wire retention element 72 to be pulled through the box 64 and conduit 76. Again, if it is not desirable to cut the wire after feeding a portion of it through the box 64 and conduit 76, it may be removed from the wire retention element 72 through a space 93 formed in the wire retention element 72.

Figure 8:
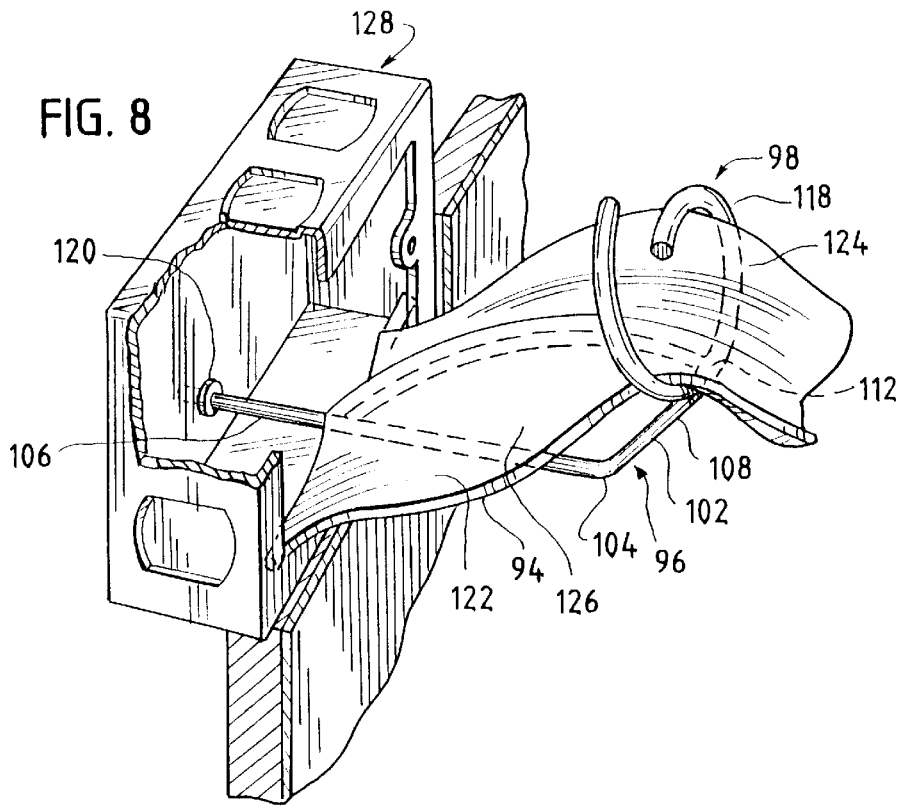
FIG. 8 is a perspective view of a third embodiment of the wire feeding guide of this invention for use with a switch or outlet box horizontally positioned in a vertical wall.
Figure 9:
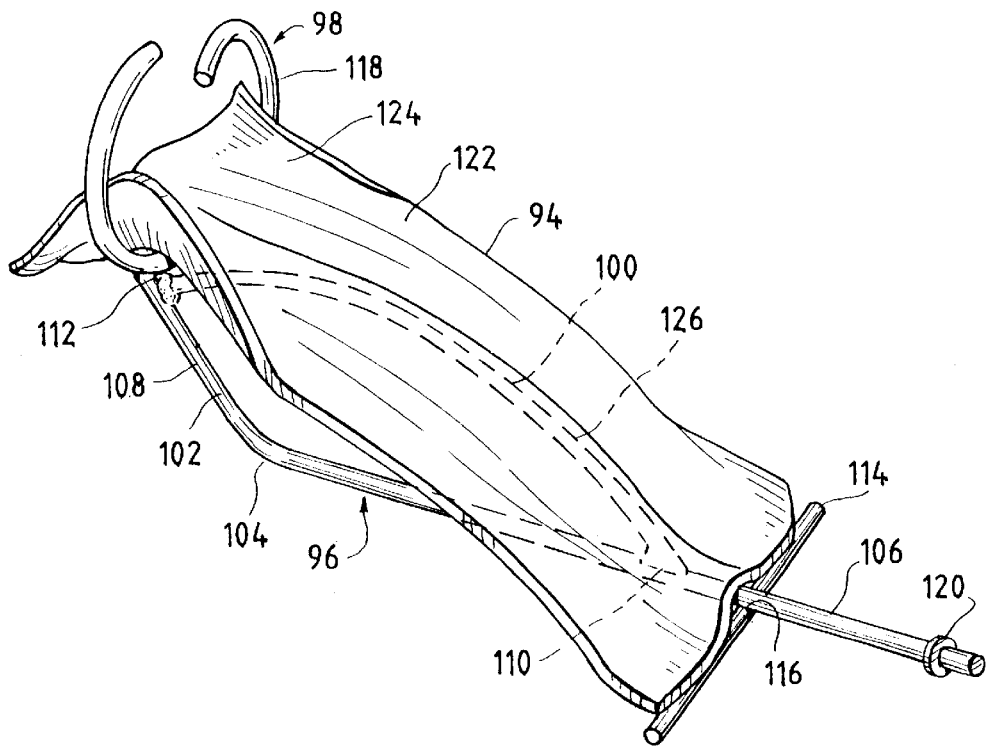
FIG. 9 is a perspective view of the third embodiment of the wire feeding guide of this invention.
Figure 10:
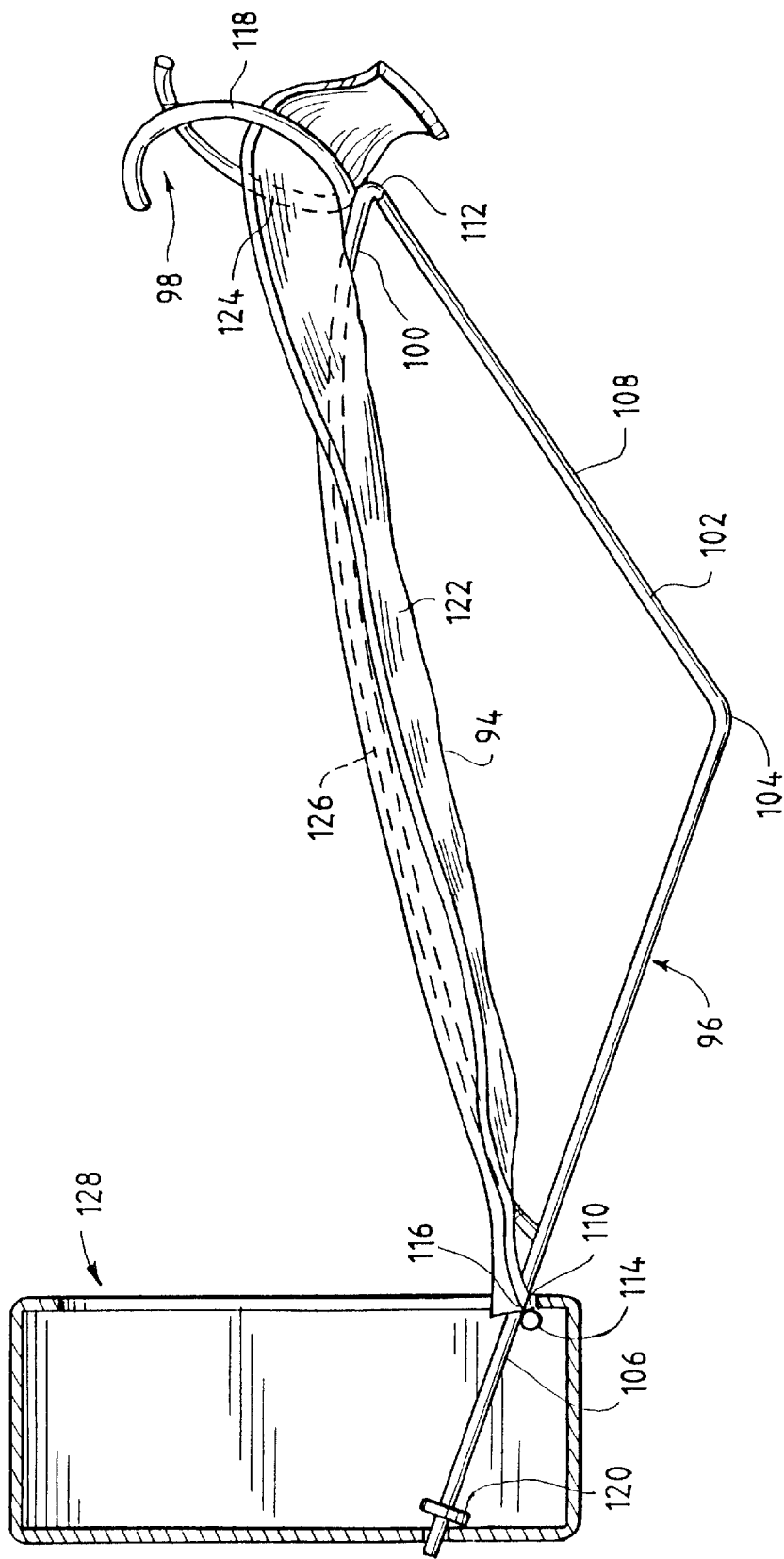
FIG. 10 is a cross-sectional view of the third embodiment of the wire feeding guide of this invention taken along the line 10—10 in FIG. 8.

Referring now to FIGS. 8–10 a third embodiment of the wire feeding guide of this invention will be discussed. The first embodiment of the wire feeding guide of this invention is useful when an electrical box has not yet been enclosed within a wall, for instance when it is surrounded by drywall which has been attached to studs, one of which supports the electrical box. When surrounded by drywall, it is no longer possible for the support arrangement to include a portion passing over and behind the electrical box. The third embodiment is designed for use with electrical boxes which have already been recessed within a wall. The third embodiment of the wire feeding guide is like the first and second in that it includes a trough-like member 94, a support arrangement 96 and a wire retention element 98.

The support arrangement 96 and wire retention element 98 are again formed of several pieces of rigid, but bendable wire. A first piece of wire 100 is formed to support the trough-like member 94. A second piece of wire 102 is formed with a bend at 104 to form a first portion 106 which extends into a electrical box and a second portion 108 which extends upwardly to the wire retention element 98. As best shown in FIG. 10, each end of the first piece of wire 100 is secured to the second piece of wire 102, such as by welding at locations 110 and 112. A third piece of wire 114 is secured at location 116 to the first portion 106 of second piece of wire 102. The third piece of wire 114 is secured at right angles to the second piece of wire 102. A fourth piece of wire 118 is formed as a helix with overlapping and spaced apart ends to form the wire retention element 98. The fourth piece of wire 118 is secured to first piece of wire at the welding location 112. To complete the support arrangement 96, a stop member 120 is provided near the free end of first portion 106 of second piece of wire 102.

The trough-like member 94 is again formed of an elongated sheet of plastic 122. The elongated sheet of plastic 122 extends from the third piece of 114 and past the fourth piece of wire 118. As in the first embodiment the elongated sheet of plastic 122 is formed to have a semicircular portion 124 within the wire retention element 98. The section of the elongated sheet of plastic 122 extending from the semicircular portion 124 to the third piece of wire 114 is formed as a wide W-shaped trough 126, with the two valleys of the W-shaped trough being on opposite sides of the first portion 106 of second piece of wire 102. The formed elongated sheet of plastic 122 is secured to the first, third and fourth pieces of wire, such as by gluing.

The third embodiment of the wire feeding guide of this invention is secured to a horizontal oriented, vertically mounted electrical box by inserting the free end of first portion 106 of second piece of wire 102, in a hole in the back wall of an electrical box 128, until the stop member 120 engages the inner side of the back wall. The third piece of wire 114 is then positioned in a lip formed at the bottom of the open front of the electrical box 128. As in the previously described embodiments, a wire or wires may be feed over the trough 126 and through a hole in the electrical box, and through a conduit secured to the hole.

Figure 11:
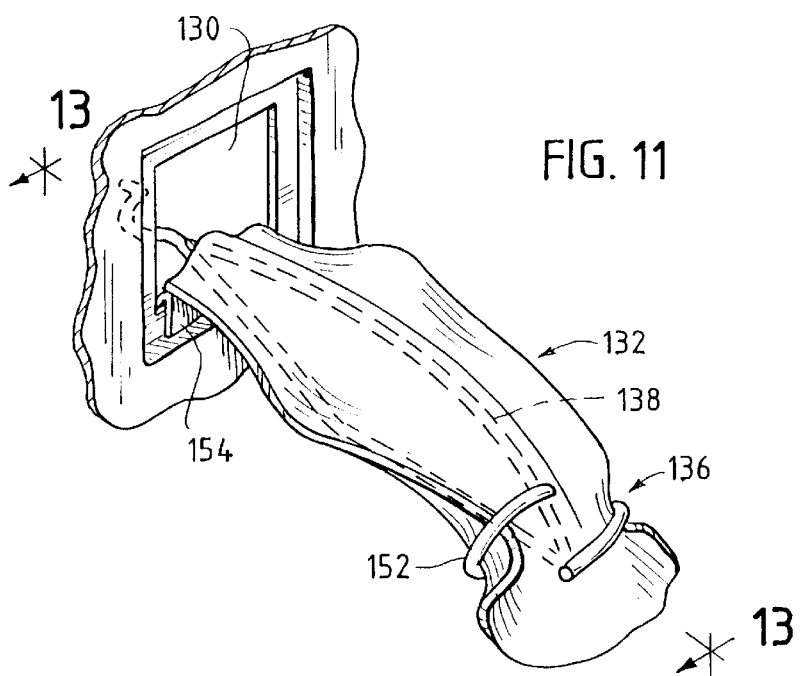
FIG. 11 is a perspective view of a fourth embodiment of the wire feeding guide of this invention for use with a switch or outlet box vertically positioned in a vertical wall.
Figure 12:
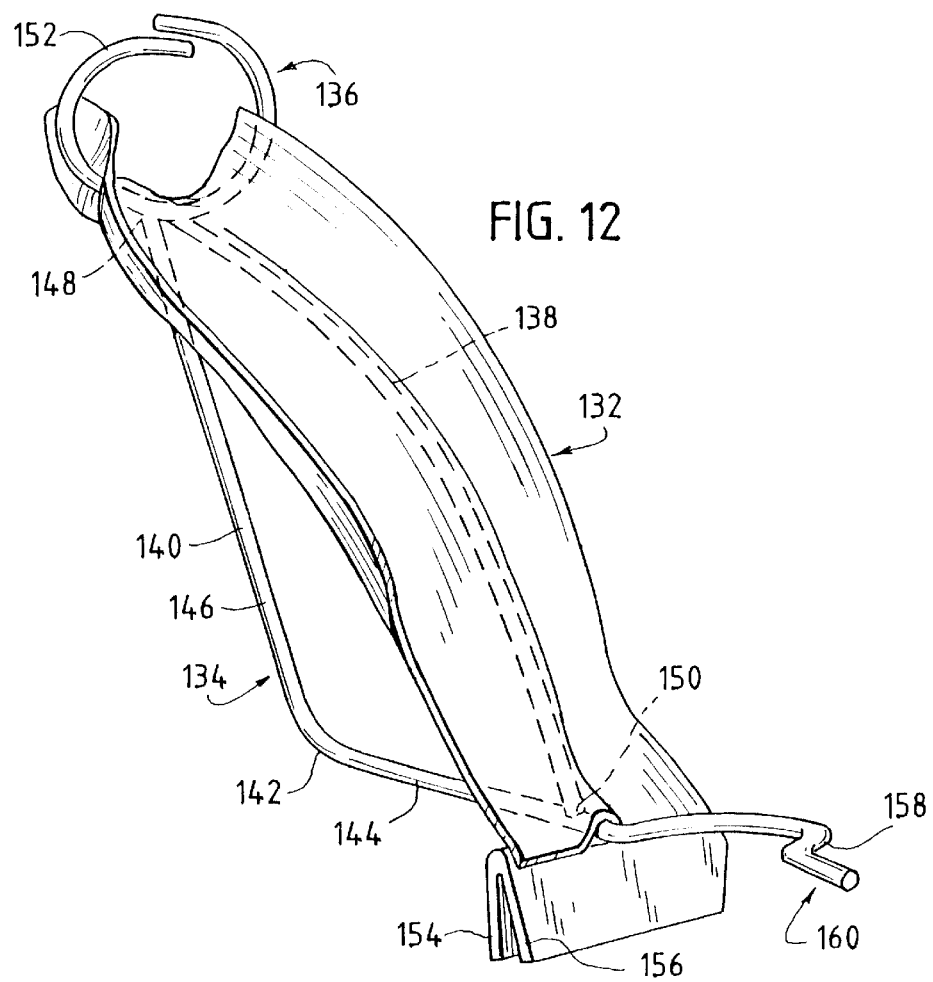
FIG. 12 is a perspective view of the fourth embodiment of the wire feeding guide of this invention.
Figure 13:
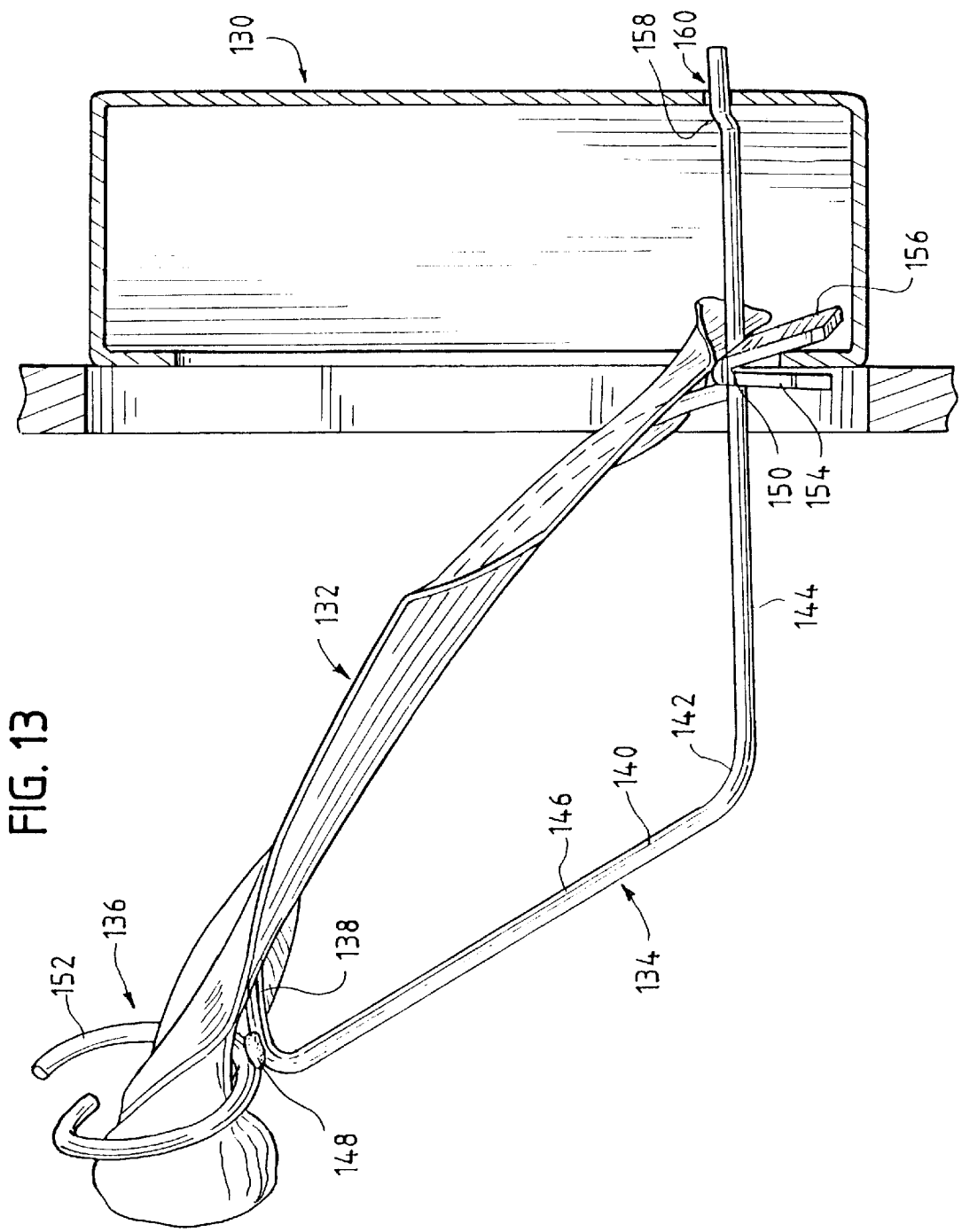
FIG. 13 is a cross-sectional view of the fourth embodiment of the wire feeding guide of this invention taken along the line 13—13 in FIG. 11.

A fourth embodiment of the wire feeding guide of this invention is shown in FIGS. 11–13. The fourth embodiment is shown for use with a vertically oriented vertically mounted electrical box 130. Again, the fourth embodiment is designed for use with electrical boxes which have already been recessed within a wall. The fourth embodiment of the wire feeding guide is like the other three in that it includes a trough-like member 132, a support arrangement 134 and a wire retention element 136. The support arrangement 134 and wire retention element 136 are again formed of several pieces of rigid, but bendable wire. A first piece of wire 138 is formed to support the trough-like member 132. A second piece of wire 140 is formed with a bend at 142 to form a first portion 144 which extends into a electrical box and a second portion 146 which extends upwardly to the wire retention element 136. As shown in FIG. 12, each end of the first piece of wire 138 is secured to the second piece of wire 140, such as by welding at locations 148 and 150. A third piece of wire 152 is formed as a helix with overlapping and spaced apart ends to form the wire retention element 136. The third piece of wire 152 is secured the to first and second pieces of wire at the welding location 148. A pair flat members 154 and 156, preferably formed of metal, are welded to the first portion 144 of second piece of wire 140 near the welding location 150. They are welded perpendicular to second piece of wire 140 so as to form a V-shaped slot which extends downward from the second piece of wire 140. A sharp bend 158 is formed near the free end of first portion 144 of second piece of wire 140, to form a stop member 160.

As shown in FIG. 13, the fourth embodiment of the wire feeding guide of this invention is secured to a vertically oriented, vertically mounted electrical box 130 by inserting the free end of first portion 144 of second piece of wire 140, in a hole in the back wall of an electrical box 130, until the stop member 160 engages the inner side of the back wall. The V-shaped slot formed by flat members 154 and 156, is placed over the lower edge of the opening in the front of the electrical box 130. As in the previously described embodiments, a wire or wires may be fed over the trough-like member 132 and through a hole in the electrical box, and through a conduit secured to the hole.

It has been found that the most important portion of the trough-like member is that which is closest to the hole in the electrical box through which the wire or wires are to be fed. It is important that the trough-like member support the wires, in the region adjacent the hole, in an position which directs the wire or wires into the hole, so as to prevent the wire or wires from tending to form a sharp bend or kink as they are pulled through the hole. Thus, while in the preferred embodiment, the support member extends from the wire retention member to the hole in the electrical box, it may be shortened so as to extend from the hole in the electrical box over only a portion of the support member toward the wire retention member.

The trough-like member may also be formed of other materials, such as sheet metal. When formed of sheet metal, both the support member and the trough-like member may both be formed of the same metal, such as either aluminum or steel, thus making it easier to fasten the support member and the trough-like member to each other by welding. Further, the trough-like member could be formed of a series of segments spaced along the length of the support member from the inlet end to the outlet end. For instance, the segments, each of which is formed with the cross-section of a trough, could be formed of round or flattened wire, with each of the segments being welded or otherwise attached to the support member in spaced apart relationship between the inlet end and the outlet end. Further, the trough-like member, the wire retention member and the support member could be formed as an integral unit, such as by being formed in a mold from a plastic or metal material.

While several embodiments of the wire feeding guide of this invention have been shown, it should be apparent to those skilled in the art that what has been described are considered at present to be exemplary embodiments of the wire feeding guide of this invention. In accordance with the Patent Statute, changes may be made in the wire feeding guide without actually departing from the true spirit and scope of this invention. The appended claims are intended to cover all such changes and modification which fall in the true spirit and scope of this invention.

What is claimed is:

1. A wire feeding guide for use in feeding wire wires through the an open front wall of the an electrical box and then through a hole in a side or back wall of the electrical box, the electrical box also having a top wall, and a bottom wall, the wired feeding guide comprising:
   an open trough forming a wire guide member, said open trough having only a lower surface for supporting the wires, and sides which do not overlay said lower surface,
   a support arrangement for supporting said wire guide member on the electrical box, such that said wire guide member extends from outside of the box through the open front wall of the box and into the box, and
   a wire retention element for retaining a wire to be fed through the open front of the electrical box into the box and through one of the holes in the sides or back wall of the box, in a position to pass over said wire guide member, said wire retention element having a opening therein through which the wire may be placed upon or lifted from the wire guide member.

2. The wire feeding guide of claim 1, wherein said support arrangement is formed of rigid wire bent into a predetermined shape.

3. The wire feeding guide of claim 2, wherein the rigid wire is steel wire, and said support arrangement is formed by welding together pieces of preformed steel wire.

4. The wire feeding guide of claim 1, wherein a portion of the support arrangement is located under and secured to said wire guide member.

5. The wire feeding guide of claim 1, wherein the wire retention element is formed as an open spiral of rigid wire, such that the wire to be fed over the wire feed guide may be place on and removed from said wire guide member through the opening in the spiral of rigid wire.

6. The wire feeding guide of claim 1, wherein said support arrangement includes at least one hook portion which engages the top wall and back wall of the electrical box.

7. The wire feeding guide claim 6, wherein said support arrangement includes a portion which extends over the open front wall of the box to engage the front edges of the top and bottom walls of the electrical box.

8. The wire feeding guide of claim 1, wherein said support arrangement includes a first portion which engages a hole in the back wall of the electrical box, and second portion which engages the front wall of the box to support the wire feeding guide on the electrical box.

9. The wire feeding guide of claim 8, wherein a stop is provided on said first portion to limit the insertion of said first portion into the hole in the back wall of the electrical box.

10. The wire feeding guide of claim 9, wherein a bend is formed in said first portion to form said stop.

11. The wire feeding guide of claim 8, wherein said second portion is a member which engages the front edge of the bottom wall of the box.

12. The wire feeding guide of claim 8, wherein said second portion is a clip which engages the front edge of the bottom wall of the box.

13. The wire feeding guide of claim 1, wherein a portion of said wire guide member extends through said wire retention member.

14. The wire feeding guide of claim 1, wherein said wire guide member extends from the hole in the box toward the wire retention member.

15. The wire feeding guide of claim 1, wherein said wire guide member is form as segments spaced from each other and extending from the hole in the box toward the wire retention member.

16. The wire feeding guide of claim 1, wherein said wire guide member, said support arrangement, and said wire retention element are formed as an integral unit.

17. The wire feeding guide of claim 16, wherein said integral unit is formed by molding.

18. The wire feeding guide of claim 1, wherein said wire retention element has an opening therein, through which a wire may be readily positioned on said wire guide member or removed from said wire feeding guide.

19. A wire feeding guide for use in feeding wire wires through the an open front wall of the an electrical box and then through a hole in a side or back wall of the electrical box, the electrical box also having a top wall, and a bottom wall, the wired feeding guide comprising:
   a trough shaped wire guide member, said trough shaped wire guide member having a wide W-shaped surface formed as a trough with two sides for guiding the wire to a hole through which it is to be passed,
   a support arrangement for supporting the trough shaped wire guide on the electrical box, such that said trough shaped member extends from outside of the box through the open front wall of the box and into the box, and
   a wire retention element for retaining a wire to be fed through the open front of the electrical box into the box and through one of the holes in the sides or back wall of the box, in a position to pass over said trough shaped wire guide member, said wire retention element having a opening therein through which the wire may be placed upon or removed from the trough shaped wire guide member.

20. A wire feeding guide for use in feeding wire wires through the an open front wall of the an electrical box and then through a hole in a side or back wall of the electrical box, the electrical box also having a top wall, and a bottom wall, the wired feeding guide comprising:

a trough shaped wire guide member, a support arrangement for supporting the trough shaped wire guide on the electrical box, such that said trough shaped member extends from outside of the box through the open front wall of the box and into the box, said support arrangement includes a sheet of rigid material having a bend formed therein such that the bend rests on an edge of an open front wall of the electrical box, and the trough shaped wire guide member extends within the box and the wire retention element is supported outside of the box, and a wire retention element for retaining a wire to be fed through the open front of the electrical box into the box and through one of the holes in the sides or back wall of the box, in a position to pass over said trough shaped wire guide member, said wire retention element having a opening therein through which the wire may be placed upon or removed from the trough shaped wire guide member, the trough shaped wire guide member extends within the box and the wire retention element is supported outside of the box.

21. A wire feeding guide for use in feeding wire wires through the an open front wall of the an electrical box and then through a hole in a side or back wall of the electrical box, the electrical box also having a top wall, and a bottom wall, the wired feeding guide comprising:

a trough shaped wire guide member, wherein the trough shaped member is form from a sheet-like material, a support arrangement for supporting the trough shaped wire guide on the electrical box, such that said trough shaped member extends from outside of the box through the open front wall of the box and into the box, and a wire retention element for retaining a wire to be fed through the open front of the electrical box into the box and through one of the holes in the sides or back wall of the box, in a position to pass over said trough shaped wire guide member, said wire retention element having a opening therein through which the wire may be placed upon or removed from the trough shaped wire guide member.

22. A wire feeding guide for use in feeding wires through an open front wall of an electrical box and then through a hole in a side or back wall of the electrical box, the electrical box also having a top wall, and a bottom wall, the wired feeding guide comprising:

an open trough forming a wire guide member, said open trough having only a lower surface for supporting the wires, and sides which do not overlay said lower surfaces, a support arrangement for removably supporting said wire guide member on the electrical box, such that said wire guide member extends from outside of the box through the open front wall of the box and into the box, said support arrangement having an inner end and an outer end, said inner end being positioned within said electrical box, and a wire retention element located proximate the outer end of said support arrangement for retaining a wire to be fed through the open front of the electrical box into the box and through one of the holes in the sides or back wall of the box, in a position to pass over said wire guide member, said wire retention element having a opening therein through which the wire may be placed upon or lifted from said wire guide member.

23. The wire feeding guide of claim 22, wherein said wire retention element has an opening therein, through which a wire may be readily positioned on said wire guide member or removed from said wire guide member.

24. The wire feeding guide of claim 22, wherein said wire guide member has a wide W-shaped surface formed as a trough with two sides for guiding the wire to a hole through which it is to be passed.

25. The wire feeding guide of claim 22, wherein said support arrangement is formed of rigid wire bent into a predetermined shape.

26. The wire feeding guide of claim 25, wherein the rigid wire is steel wire, and said support arrangement is formed by welding together pieces of preformed steel wire.

27. The wire feeding guide of claim 22, wherein a portion of the support arrangement is located under and secured to said wire guide member.

28. The wire feeding guide of claim 22, wherein said support arrangement includes at least one hook portion which engages the top and back walls of the electrical box.

29. The wire feeding guide claim 28, wherein said support arrangement includes a portion which extends over the open front wall of the box to engage the front edges of the top and bottom walls of the electrical box.

30. The wire feeding guide of claim 22, wherein said support arrangement includes a first portion which engages a hole in the back wall of the electrical box, and second portion which engages the front wall of the box to support the wire guide on the electrical box.

31. The wire feeding guide of claim 30, wherein a stop is provided on said first portion to limit the insertion of said first portion into the hole in the back wall of the electrical box.

32. The wire feeding guide of claim 31, wherein a bend is formed in said first portion to form said stop.

33. The wire feeding guide of claim 30, wherein said second portion is a member which engages the front edge of the bottom wall of the box.

34. The wire feeding guide of claim 30, wherein said second portion is a clip which engages the front edge of the bottom wall of the box.

35. The wire feeding guide of claim 22, wherein a portion of said wire guide member extends through said wire retention member.

36. The wire feeding guide of claim 22, wherein said wire guide member extends from the hole in the box toward the wire retention member.

37. The wire feeding guide of claim 22, wherein said wire guide member is form from sheet material.

38. The wire feeding guide of claim 22, wherein said wire guide member is form as segments spaced from each other and extending from the hole in the box toward the wire retention member.

39. The wire feeding guide of claim 22, wherein said wire guide member, said support arrangement, and said wire retention element are formed as an integral unit.

40. The wire feeding guide of claim 41, wherein said integral unit is formed by molding.

41. A wire feeding guide for use in feeding wires through an open front wall of an electrical box and then through a hole in a side or back wall of the electrical box, the electrical box also having a top wall, and a bottom wall, the wired feeding guide comprising:

a trough shaped wire guide member, a support arrangement for removably supporting the trough shaped wire guide on the electrical box, such that said trough shaped wire guide member extends from outside of the box through the open front wall of the box and into the box, said support arrangement having an inner end and an outer end, said inner end being positioned within said electrical box, and a wire retention element located proximate the outer end of said support arrangement for retaining a wire to be fed through the open front of the electrical box into the box and through one of the holes in the sides or back wall of the box, in a position to pass over said trough shaped wire guide member, said wire retention element having a opening therein through which the wire may be placed upon or removed from the trough shaped wire guide member, said wire retention element is formed as an open spiral of rigid wire, such that the wire to be fed over the wire guide may be place on and removed from the trough shaped member through the opening in the spiral of rigid wire.

42. A wire feeding guide for use in feeding wires through an open front wall of an electrical box and then through a hole in a side or back wall of the electrical box, the electrical box also having a top wall, and a bottom wall, the wired feeding guide comprising:

a trough shaped wire guide member, a support arrangement for removably supporting the trough shaped wire guide on the electrical box, such that said trough shaped wire guide member extends from outside of the box through the open front wall of the box and into the box, said support arrangement having an inner end and an outer end, said inner end being positioned within said electrical box, wherein the support arrangement includes a sheet of rigid material having a bend formed therein such that the bend rests on an edge of an open front wall of the electrical box, and the trough shaped wire guide member extends within the box and the wire retention element is supported outside of the box, and a wire retention element located Proximate the outer end of said support arrangement for retaining a wire to be fed through the open front of the electrical box into the box and through one of the holes in the sides or back wall of the box, in a position to pass over said trough shaped wire guide member, said wire retention element having a opening therein through which the wire may be placed upon or removed from the trough shaped wire guide member, said wire retention element is formed as an open spiral of rigid wire, such that the wire to be fed over the wire guide may be place on and removed from the trough shaped member through the opening in the spiral of rigid wire.

* * * * *